Patented May 2, 1950

2,506,536

UNITED STATES PATENT OFFICE 2,506,536

2-CARBOXYALKYLTHIOPHANE-3,4-DICARBOXYLIC ACID

Bernard R. Baker, Nanuet, N. Y., assignor, by mesne assignments, to American Cyanamid Company, New York, N. Y., a corporation of Maine No Drawing. Application July 16, 1945, Serial No. 605,464

4 Claims. (Cl. 260—329)

This invention relates to new organic compounds and to methods of their preparation. More particularly, the invention relates to 3,4-dicarboxythiophanes and esters thereof.

The new compounds which are included within the scope of the present invention may be illustrated generally by the following structural formula:

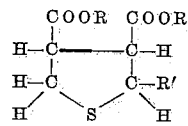

wherein R is hydrogen or an alkyl radical and R' is a radical of the group consisting of hydrogen, alkyl, phenoxyalkyl, carboxy, carboxyalkyl and carbalkoxyalkyl radicals. In the above general formula, the radicals represented by R are the same.

The compounds of the present invention are prepared from the corresponding dihydrothiophene-3,4-dicarboxylic acid by reduction with sodium amalgam. They are generally white crystalline solids, soluble in dilute alkali and most oxygen containing organic solvents. Compounds having the same empirical formula may have different melting points because of cis and trans isomeric forms.

The dihydrothiophene-3,4-dicarboxylic acid intermediates may be prepared by methods shown in the specific examples which follow. Apparently any of 2,3; 2,5; and 4,5 dihydrothiophene-3,4-dicarboxylic acids, having the type formula described can be employed in the reactions described herein. Among these may be specifically mentioned: dihydrothiophene-3,4-dicarboxylic acid, 2-(delta-carboxybutyl) dihydrothiophene-3,4-dicarboxylic acid, 2-(gamma-carboxypropyl) dihydrothiophene-3,4-dicarboxylic acid, 2-carboxymethyl dihydrothiophene-3,4-dicarboxylic acid, 2-(gamma-phenoxypropyl) dihydrothiophene-3,4-dicarboxylic acid, 2-(gamma-chlorophenoxypropyl) dihydrothiophene-3,4-dicarboxylic acid, 2-(delta-phenoxybutyl) dihydrothiophene-3,4-dicarboxylic acid, 2-(delta-nitrophenoxybutyl) dihydrothiophene-3,4-dicarboxylic acid, 2-propyl-dihydrothiophene-3,4-dicarboxylic acid, 2-butyl dihydrothiophene-3,4-dicarboxylic acid, 2-carboxy dihydrothiophene-3,4-dicarboxylic acid, and the like.

In preparing compounds of the present invention I suspend a dihydrothiophene-3,4-dicarboxylic acid in a suitable solvent such as water, ethanol, methanol, dioxane, etc. or mixtures thereof. An alkali metal hydroxide and sodium amalgam are added and the mixture heated at a temperature of from about 20° C. to about 120° C. I prefer to carry out the invention at a temperature of 70° to 80° C. when a -2,3- or -4,5-dihydrothiophene is used as an intermediate, while 90° to 100° C. is preferred when a -2,5-dihydrothiophene is used. The reaction is usually complete in from about one-half to about ten hours.

The reaction mixture contains both the cis and trans isomers in solution. The isomers are seperated from inorganic material by acidifying the decanted liquid and then extracting with a water immiscible solvent such as ethyl acetate, benzene, ether, chloroform, etc. The trans isomer is obtained from the extract by evaporation of the solvent and crystallization from solvents such as benzene, acetone, carbon tetrachloride, ethyl acetate or mixtures thereof. The filtrate containing a cis acid can be treated to obtain a further quantity of the crystalline trans acid as shown in Example 1. Upon heating the trans isomer with an anhydride such as acetic anhydride, propionic anhydride, etc. the cis isomer is obtained, as shown in Example 5. This reaction is facilitated by the addition of an alkali metal salt of an organic acid such as sodium acetate, sodium propionate and the like.

I can prepare the desired esters of the compounds of the present invention by heating the compounds in the corresponding alcohol acidified with a mineral acid.

The compounds of the present invention are useful as intermediates in the preparation of antivitamins and vitamins, such as biotin.

The preparation of typical dihydrothiophene-3,4-dicarboxylic acids and the preparation of representative -3,4-dicarboxythiophanes from dihydrothiophene-3,4-dicarboxylic acids will now be illustrated in the following specific examples:

Example 1

To a solution of 18.5 g. of sodium methoxide and 43 g. (39 cc.) of methyl 3-mercaptopropionate in 110 cc. of methanol was added with stirring, a solution of 81 g. of methyl 2-bromopimelate in 60 cc. of methanol over a period of two hours maintaining the temperature at —22° C. to —18° C. After standing at room temperature for eight hours protected from moisture, the solution was diluted with three volumes of water and extracted twice with benzene. The combined extracts were washed with aqueous sodium bicarbonate, dilute hydrochloric acid and then distilled. A yield of 82 g. (88%) of methyl 2-(carbomethoxyethylthio)-pimelate, boiling point 192°–195° C. (1 mm.) was obtained.

To a suspension of 33 g. of sodium methoxide in 500 cc. of benzene was added 135 g. of methyl 2-(carbomethoxyethylthio)-pimelate in 100 cc. of benzene. The nearly clear solution, after standing 18 hours at room temperature protected from moisture, was extracted twice with ice water, using enough to dissolve the sodium salt. The aqueous extracts were immediately run into iced hydrochloric acid, the oil extracted with benzene, washed successively with aqueous sodium bicarbonate and water, then evaporated to dryness in vacuo. A yield of 96.4 g. (80%) of 2-(delta-carbomethoxybutyl)-3-keto-4-carbomethoxythiophane was obtained as an orange-yellow oil.

To a mixture of 55 g. of the product obtained immediately above and 20 cc. of liquid hydrogen cyanide at 0° C. was added 0.3 cc. of 50% aqueous potassium hydroxide. After 16 hours at 0° C., the mixture was acidified with 1 cc. of 85% phosphoric acid and volatile material removed in vacuo. A quantitative yield of 2-(delta-carbomethoxybutyl)-3-hydroxy-3-cyano-4-carbomethoxythiophane was obtained as a nearly colorless oil.

A solution of 62.5 g. of the product above in 100 cc. of benzene was dried with anhydrous sodium sulfate and the drying agent rinsed with 50 cc. of benzene. To the solution, diluted with 150 cc. of reagent pyridine and cooled to 15° C., was added 43 cc. of phosphorus oxychloride. The temperature gradually rose to 40° C. and was occasionally cooled to maintain the temperature at 40° C.–48° C. In thirty minutes the heat of reaction started to subside. After a total of 6 hours, the mixture was poured on ice. The separated organic layer, washed successively with dilute hydrochloric acid, aqueous sodium bicarbonate and dilute hydrochloric acid, was then distilled. A yield of 41 g. (70%) of 2-(delta-carbomethoxybutyl)-3-cyano-4-carbomethoxy-4,5-dihydrothiophene was obtained as a yellow oil, boiling point 192°–198° C. (1 mm.).

A solution of 29.2 g. of the compound obtained immediately above in 90 cc. of acetic acid and 150 cc. of concentrated hydrochloric acid was refluxed for sixteen hours then evaporated to dryness in vacuo. The residue was extracted with 300 cc. of hot acetone, filtered and the extract evaporated to dryness in vacuo. The residue was crystallized from ethyl acetate and benzene. A yield of 23.2 g. (83%) of 2-(delta-carboxybutyl)-4,5-dihydrothiophene-3,4-dicarboxylic acid was obtained, which melted at 127°–129° C. with decomposition.

A solution of 23.5 g. of 2-(delta-carboxylbutyl)-4,5-dihydrothiophene-3,4-dicarboxylic acid in 106 cc. of 10% sodium hydroxide and 140 cc. of water was stirred with 265 g. of 2% sodium amalgam at 70°–80° C. (bath temp.) for one hour. The decanted solution was acidified, saturated with salt, and extracted with two 250 cc. portions of ethyl acetate. The extracts dried with anhydrous magnesium sulfate, were evaporated to dryness and the semicrystalline residue, recrystallized from ethyl acetate-benzene (1:4). A yield of 11.4 g. (49%) of 2-(delta-carboxybutyl)thiophane-3,4-trans-dicarboxylic acid was obtained, having a melting point of 105°–110° C. with decomposition. A trianilide was prepared from the triacid and melted at 242°–243° C.

A further quantity of trans acid can be obtained from the filtrate remaining after the reduction of 2-(delta-carboxybutyl)-4,5-dihydrothiophene-3,4-dicarboxylic acid above, by the following method. The filtrate remaining after removal of the crystalline trans acid was evaporated to dryness in vacuo. The residue, crude cis acid, was esterified by refluxing with 200 cc. of methanol, 300 cc. of chloroform and 5 cc. of concentrated sulfuric acid for eighteen hours with continuous water removal. The solution was washed with water, evaporated to dryness in vacuo and dissolved in 150 cc. of methanol containing 5 g. of sodium methoxide. After being refluxed for two hours (rearrangement of the cis isomer to the trans takes place), the solution was diluted with 33 g. of potassium hydroxide in 50 cc. of water and refluxed thirty minutes more. Most of the methanol was evaporated, the solution diluted with water, acidified, saturated with salt and extracted three times with ethyl acetate. The dried extracts were evaporated in vacuo and the residue crystallized from ethyl acetate-benzene (1:4). Tan crystals of the trans acid was obtained which were identical with the trans acid obtained directly above. Melting point 110°–114° C.

*Example 2*

A solution of 3.5 g. of 2-(gamma-phenoxypropyl)-2,3-dihydrothiophene-3,4-dicarboxylic acid in 9.5 cc. of 10% sodium hydroxide and 13 cc. of water was stirred with 34 g. of 2% sodium amalgam at a bath temperature of 70°–75° C. for two hours. The decanted solution was acidified, extracted with ethyl acetate, washed with water and evaporated to dryness in vacuo. The residue was crystallized from benzene and recrystallized from acetone-ethylene dichloride. The trans acid was obtained having a melting point of 182°–183° C.

*Example 3*

A solution of 9.8 g. of 2-(gamma-phenoxypropyl)-4,5-dihydrothiophene-3,4-dicarboxylic acid in 27 cc. of 10% sodium hydroxide and 30 cc. of water was stirred with 98 g. of 2% sodium amalgam at 70°–80° C. for ninety minutes. After decantation from the mercury, the solution was acidified, extracted with ethyl acetate, washed with dilute hydrochloric acid and evaporated to dryness in vacuo. The semi-crystalline residue was triturated with benzene; weight of insoluble material was 2.4 g. It was dissolved in 50 cc. of warm acetone, filtered from some insoluble material, concentrated to about 5 cc. and diluted with benzene which gave white crystals. Recrystallization from acetone-ethylene dichloride gave 2-(gamma-phenoxypropyl)-thiophane-3,4-dicarboxylic acid, melting point 179°–180° C. The product gave no depression in melting point when mixed with the product of Example 2.

*Example 4*

A solution of 2.0 g. of 2-propyl-2,3-dihydrothiophene-3,4-dicarboxylic acid anhydride in 10 cc. of water and 8 cc. of 10% sodium hydroxide was shaken with 22 g. of 3% sodium amalgam and warmed on the steam bath for one hour. The decanted solution containing the cis and trans isomers was acidified and cooled. The semisolid trans acid was crystallized from benzene yielding white crystals. The product, 2-propylthiophane-3,4-transdicarboxylic acid when recrystallized from an acetone-benzene mixture had a melting point of 156°–157° C.

*Example 5*

A mixture of 1.07 g. crystalline 2-propylthiophane-3,4-trans dicarboxylic acid and 5 cc. of propionic anhydride was refluxed two hours. The volatile material was removed by distillation in vacuo on the steam bath. The residue was warmed with excess 10% sodium hydroxide until in solution, then acidified. After saturation with salt, the aqueous solution was extracted with ethyl acetate. Evaporation gave an oil which was crystallized from carbon tetrachloride as white crystals. The 2-propylthiophane-3,4-cis dicarboxylic acid was purified by recrystallization from carbon tetrachloride-petroleum ether and gave a melting point of 130°–131° C.

*Example 6*

A solution of 500 mg. of 2-(gamma-phenoxypropyl) thiophane-3,4-trans-dicarboxylic acid (melting point 182°–184° C.) in 2.5 cc. of propionic anhydride was refluxed for three hours, then the excess anhyride distilled in vacuo. The residue was distilled in a two-bulbed flask at 1 m. m. The distillate partially solidified on standing. Crystallization from benzene petroleum ether gave white crystals. Further recrystallization in the same manner gave 2-(gamma-phenoxypropyl)-thiophane-3,4-cis - dicarboxylic acid anhydride having a melting point of 104°–105° C.

The corresponding cis diacid was obtained by acidification of an alkaline solution of the anhydride. The 2-(gamma-phenoxypropyl) - thiophane-3,4-cis dicarboxylic acid had a melting point of 157°–158° C.

*Example 7*

A solution of 3.3 g. of 2,5-dihydrothiophene-3,4-dicarboxylic acid (obtained by alkaline hydrolysis of 3-cyano-4-carbomethoxy-4,5-dihydrothiophene) in 60 cc. of 1 N. sodium hydroxide was stirred with 125 g. of 2% sodium amalgam at 90° to 100° C. for four hours. The liquid portion was decanted, acidified and saturated with salt. The solution was extracted three times with ethyl acetate, the extracts dried with anhydrous magnesium sulfate and evaporated in vacuo. The residue was recrystallized from acetone-benzene mixture. White crystals were obtained having a melting point of 124°–125° C., which on continued heating resolidifies and remelts at 134°–135° C. A yield of 2.1 g. (64%) of thiophane-3,4-trans-dicarboxylic acid was obtained.

*Example 8*

A solution of 5.6 g. of 2-(delta-carboxybutyl) thiophane-3,4-trans-dicarboxylic acid and 1 cc. of concentrated sulfuric acid in 50 cc. of chloroform and 50 cc. of methanol was refluxed for eighteen hours with continuous drying. The solution was washed with aqueous sodium bicarbonate and evaporated. A yield of 4.5 g. (75%) of 2-(delta-carbomethoxybutyl)-3,4-trans-dicarbomethoxythiophane was obtained as an oil.

*Example 9*

A solution of 8.4 g. of 2-carboxymethyl-2,3-dihydrothiophene-3,4-dicarboxylic acid in 100 cc. of 4% sodium hydroxide was stirred with 108 g. of 2% sodium amalgam at 70°–75° C. for ninety minutes. The solution, decanted from the mercury, was acidified, saturated with sodium chloride and extracted twice with ethyl acetate. The extracts were dried with anhydrous magnesium sulfate and evaporated to dryness in vacuo. Crystallization from ethyl acetate-benzene gave white crystals of 2 - carboxymethylthiophane-3,4 - trans - dicarboxylic acid melting at 191°–191.5° C.

I claim:
1. Chemical compounds having the general formula:

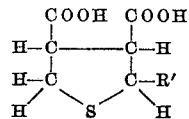

wherein R' is a carboxyalkyl radical.
2. 2-(delta-Carboxybutyl) thiophane - 3,4 - dicarboxylic acid.
3. 2 - (gamma - Carboxypropyl) thiophane-3,4-dicarboxylic acid.
4. 2-Carboxymethylthiophane-3,4-dicarboxylic acid.

BERNARD R. BAKER.

REFERENCES CITED

The following references are of record in the file of this patent:

UNITED STATES PATENTS

| Number | Name | Date |
| --- | --- | --- |
| 2,382,418 | Hoffmann | Aug. 14, 1945 |
| 2,400,436 | Patterson | May 14, 1946 |
| 2,417,326 | Schnider | Mar. 11, 1947 |

OTHER REFERENCES

Steinkopf, Die Chemie des Thiophens, page 104, Edwards Lithoprint (1941).